Dec. 29, 1942.  C. E. WIESSNER  2,306,417
MECHANICAL SEAL
Filed Jan. 27, 1941  2 Sheets-Sheet 1

CHRISTOPHER E. WIESSNER
INVENTOR

BY *Robert E. Wadhams*
ATTORNEY

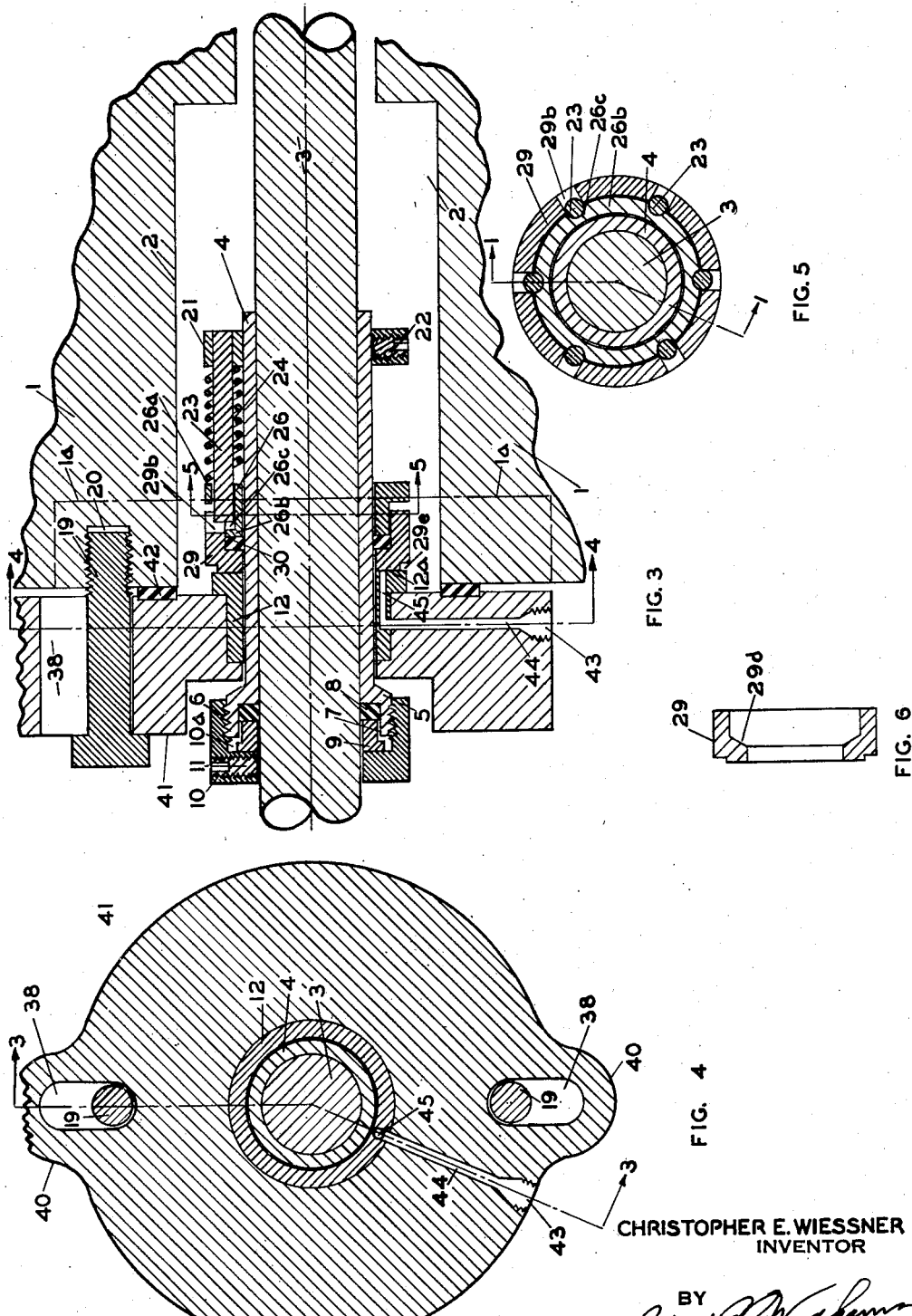

Patented Dec. 29, 1942

2,306,417

UNITED STATES PATENT OFFICE 2,306,417

MECHANICAL SEAL

Christopher E. Wiessner, Kalamazoo, Mich., assignor to Durametallic Corporation, Kalamazoo, Mich., a corporation of Michigan Application January 27, 1941, Serial No. 376,096

10 Claims. (Cl. 286—8)

This invention relates to mechanical sealing devices for application to rotary pumps and similar devices, with particular reference to a type of mechanical seal which is entirely self-contained and, hence, may be inserted into the stuffing box of a pump without precise machining of any of the parts of said pump and without any special structure on such pump.

In the art prior to this time, there have been many types of mechanical seals known, all of which contemplated a smoothly machined surface upon an annular sealing member surrounding the shaft of said pump and rigidly fixed into the inner end of the stuffing box or into the gland of the pump, and cooperating with a smoothly machined sealing face upon an annular member securely affixed to the rotating shaft of the pump in such a manner that the said rotating sealing face was held tightly against the above mentioned fixed sealing face. By this arrangement, liquid within the pump working along the shaft thereof to said stuffing box could not pass between said opposed and contacting sealing faces and hence was held against escape from said pump. Properly assembled, this arrangement worked very well and has been and is now in wide use throughout the entire country, particularly in oil refineries wherein there is made high test gasoline and other highly volatile petroleum products.

There has been experienced, however, one extreme difficulty with the above generally described arrangement. Inasmuch as the mechanical seals are ordinarily made by one company and by it shipped to a separate pump manufacturing company for installation into the pump, in many cases at points far removed from the location of the company manufacturing the seals, it is necessary for the pump company to do a part of the machining and installation incident to the construction, assembly and fitting together of the sealing mechanism. This, accordingly, forces the pump company to do work for which it often has not the experience to do properly. Hence, the seals are often improperly installed and consequently leak.

It is an object of this invention to provide a type of seal of similar general construction, but which may be completely assembled, fitted and tested by the seal manufacturing company and which may, accordingly, be installed into the pump by a simple operation which does not require any precise machining or fitting. Accordingly, by the within disclosed invention, the pump company may have a considerable margin of error in the construction of the stuffing box of its pump and still the seal will fit therein and hold the contents of the pump tightly against any leakage.

While it is recognized that this particular type of seal may be somewhat more expensive to manufacture, it will be welcomed by the entire industry. It will relieve the pump companies from unaccustomed and burdensome machining and fitting for which they have neither the desire nor the experience; it will relieve the user of the pumps from the inconvenience, annoyance and expense incident to leaking pumps; and it will relieve both the pump company and the seal manufacturing company from the annoyance of complaints about leaking seals and from the expense of service calls to places which are often many hundred miles away from its home offices.

There also exists in presently known designs for mechanical seals a necessity that the pump housing with which said seals are to be used be fitted with various kinds of shoulders or counterbores or be enabled to receive various kinds of set screws, as well as many other types of required fixed locating points in order that the seal may be properly secured to the pump. It has, accordingly, been found desirable to manufacture a mechanical seal which may be inserted into the stuffing box of a pump without the necessity of the above mentioned fastening or locating devices and, accordingly, the within described invention discloses a seal which may be applied to any ordinary pump housing without the necessity of the pump housing being fitted with any special fastening, locating or other similar devices, excepting only the two holes which are in any standard manufacture bored into said pump housing for the reception of two ordinary bolts.

It should also be expressly pointed out that the within disclosed invention contemplates a mechanical seal which is entirely self-contained and as respecting formerly known seals may well be illustrated by comparing a cartridge ammunition for a rifle with the old-style powder, ball and wadding. By being completely self-contained, this seal may be completely tested in the factory before the same is shipped for installation into a pump and, further, it may be tested under actual conditions under which the intended customer plans to use this particular seal. It may also be "run in" at the factory of the seal manufacturing company and, accordingly, free the ultimate customer from the necessity of undergoing costly "run-in" periods.

It should also be pointed out that whereas in the former seal construction oil holes which were necessary for introducing a pressure and/or lubricating fluid into the interior of the seal were often necessarily drilled through the stuffing box of the pump, thus requiring further work to be done by the pump manufacturing company in order to install mechanical seals into place. However, by the within disclosed invention the oil introducing openings are in the gland which is a part of the seal assembly and hence is also included in the finished sealing unit.

It may be proper also to point out that the herein disclosed sealing unit may be fitted onto and operate with a scored or scratched shaft or sleeve whereas in presently known mechanical sealing devices it is necessary that the shaft be entirely smooth and free from scoring.

A further advantage of this arrangement will be found in the ease with which it can be removed from the stuffing box for resetting or adjustment or repair. In many of the presently used mechanical seals wherein one of the non-rotating sealing members is rigidly fixed to the stuffing box of the pump, or the rotating sealing member is affixed to the shaft inside of the stuffing box, the entire pump must be dismantled and taken apart in order to remove the seals for resetting, adjustment or repair. This, of course, requires the pump to be shut down for several hours or even days and requires the work of one or more men, in some cases, for several days. It is, accordingly, desirable to provide a type of seal which may be removed bodily from the stuffing box of the pump by a simple operation which does not affect the pump as a whole and which may be done quickly by a single workman. The seal herein disclosed will provide this advantage and thus avoid the costly and time consuming delays and pump shut downs incident to the presently used mechanical seals.

There has also been observed in the practice of petroleum refining a necessity for positively preventing the escape into the atmosphere of dangerous liquids within a pump; for example, even a slight leakage of propane will create a highly explosive condition. Hence it is desirable to place a liquid in the pump stuffing box which will seal the same against all leakage whatever.

It has also been noted in presently manufactured and operated seals that the pins by which the rotating sealing member is driven are usually radially positioned with respect to the shaft of the pump and hence there is a strong tendency for these pins to respond to centrifugal force and also the drag action of the rotating sealing member where the mechanism is operating at a high rate of speed and, accordingly, to work loose and fly out of position. Likewise, in presently operated seals, the pins which are installed parallel to the axis of the shaft of the pump, unless rigidly fixed into the rings by which they are held, often tend to work out of position in a direction parallel to the axis of the pump. Hence, it is desirable to create a device by which these pins can not work loose in any direction and, accordingly, will always remain in proper position.

Accordingly, the principal object of my invention is to provide a self-contained cartridge seal of the mechanical seal type which contains within itself all essential sealing members.

A further object of my invention is to provide a self-contained mechanical cartridge seal which may be installed into the stuffing box of a pump wherein said stuffing box is machined with only reasonable accuracy and wherein precise fitting is not required.

A further object of my invention is to provide a self-contained mechanical seal containing all essential parts within itself which may be installed into the stuffing box of a pump merely by sliding the same onto the shaft of the pump and affixing the same in place by standard fastening devices.

A further object of my invention is to provide a mechanical seal of the self-contained cartridge type which may be completely assembled and tested by the company manufacturing the same and which need not be dis-assembled for installation into the stuffing box wherein the same is to be used.

A further object of my invention is to provide a self-contained mechanical seal of the cartridge type which may be removed from the stuffing box of a pump by a simple operation when it is desired to adjust or repair the parts thereof.

A further object of my invention is to provide a mechanical seal which may be completely tested at the factory of the seal manufacturing company under conditions of use for each particular customer, and which will also eliminate costly "run-in" periods which, under presently known practice, is necessary to be done by the ultimate user of the seal.

A further object of my invention is to provide a seal which may be installed into the stuffing box of a pump housing without the necessity of said pump housing or stuffing box being fitted with any particular locating or fastening means such as shoulders, counterbores or means for receiving and/or adjusting set screws.

A further object of my invention is to provide a mechanical seal which may be used on a scored or scratched pump shaft or sleeve as well as upon a smooth and perfect one.

A further object of my invention is to provide a mechanical seal wherein the pins by which the rotating sealing member is driven will always remain in proper position.

A further object of my invention is to provide a seal which will positively hold against leakage from a pump, or similar equipment, such liquids of small molecules as propane and other products of the light end of petroleum.

Other desirable objects and purposes and advantages of the herein disclosed invention will be apparent to those skilled in the art upon a careful reference to the accompanying drawings and the hereinafter appearing description. Inasmuch as the herein disclosed invention is believed to be a broad advance in the art, it is expected that the hereinafter appended claims will be entitled to a broad construction except as they may be specifically by their own terms limited.

The particular embodiment of the herein disclosed invention, which has been selected for illustration thereof, is illustrated in the accompanying drawings wherein:

Figure 3 represents a modified form of the sealing device and shows the same upon a section taken along the line 3—3 of Figure 4.

Figure 4 represents a section view of the said modified form, which view is taken along the line 4—4 of Figure 3.

Figure 5 represents a section view of a portion of the sealing mechanism which is taken along the line 5—5 as shown in both Figures 1 and 3.

Figure 6 represents a section view taken on a plane through the axis of a rotating sealing member, such as 29, and showing a modified form thereof.

Inasmuch as in the two forms shown most of the parts are identical, all of the members which are the same in both forms shown have been numbered identically and only those parts which are dissimilar have been assigned independent numbers.

Figure 1:
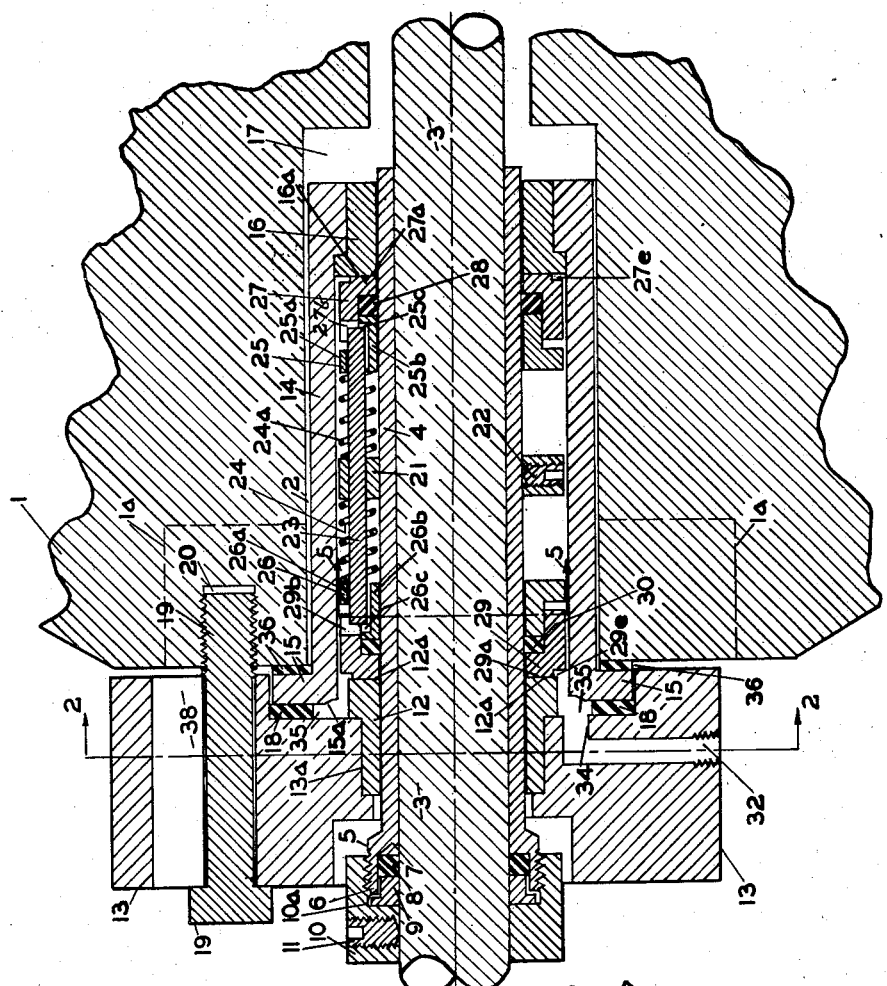
Figure 1 represents a section taken through the longitudinal axis of the shaft, sealing mechanism and stuffing box on the plane shown by line 1—1 of Figure 2.
Figure 2:
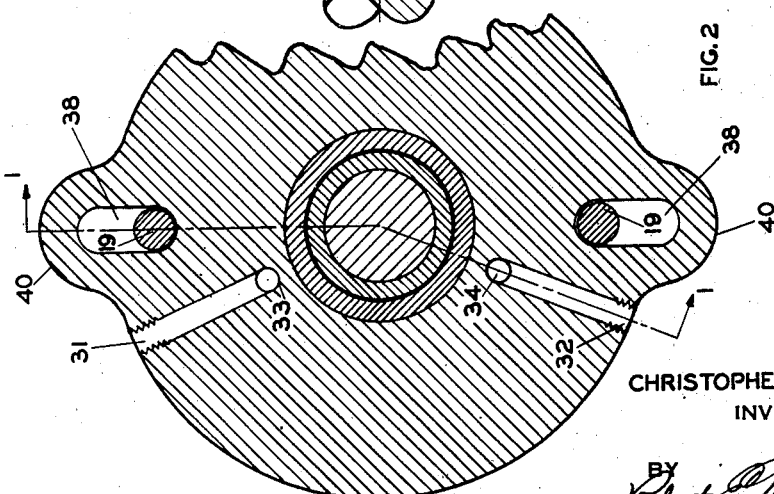
Figure 2 represents a section taken along the line 2—2 of Figure 1.

Turning attention now to the specific construction of the herein disclosed device in the form as shown in Figures 1 and 2, the number 1 indicates a broken showing of a pump housing containing the bore 2 constituting the stuffing box. The numeral 3 designates the shaft of the pump. These named members represent the pump in the stuffing box area in its ordinary state and the rest of the members hereinafter indicated and described together constitute the herein disclosed invention.

The sleeve 4 fits snugly onto shaft 3 and has at its outer end enlarged portion 5 which is threaded as at 6. Said enlarged portion 5 has a counterbored chamber 7 within itself, and said chamber 7 accommodates a packing ring 8 which is made of rubber or any other conventional packing material and a follower gland ring 9 which acts to hold ring 8 tightly in place. Annular member 10 fits over shaft 3 and is provided with chamber 10—a which is threaded to fit over the threaded portion 5 of sleeve 4. Said member 10 holds rings 9 and 8 tightly in place as shown. The threading at 6, between members 5 and 10 must, of course, be either right-hand or left-hand threads according to the direction of rotation of said shaft 3. Set screw 11 holds member 10 against turning with respect to shaft 3.

Insert 12 is made of bronze or other suitable material and lies around sleeve 4 in a "clearance fit" to provide a definite clearance, such as 1/32 of an inch, between the insert 12 and the sleeve 4. This clearance, together with other similar clearances which are provided in various parts of the herein described mechanism, permits a flexibility within the sealing mechanism by which the same will adjust itself to any reasonably likely misalignment of the shaft and pump housing. Said insert 12 has a smoothly machined surface 12—a on its surface inward of said sealing mechanism and the said insert is tightly press fitted into place within bore 13—a of member 13 by which it will be held against rotation and will be fluid tight with respect to member 13. Said member 13 may be variously termed a gland member, ring member, closure ring or clamp ring.

Member 14 is of annular construction and completely surrounds shaft 3 as well as the other members shown which are associated with shaft 3. Said member 14 may be variously designated a bonnet, case, outer sleeve or shell, but for convenience will be hereinafter termed a case. Case 14 has upon its outer end flange 15, the shoulder of which rests against gasket 36 which in turn rests against the pump housing 1 in the area adjacent the stuffing box 2. Said case 14 in the portion thereof comprising flange 15 is slightly recessed as shown at 15—a for purposes hereinafter described. At the inward extremity of said case 14 is insert 16 which is made of bronze or other suitable material and fits around sleeve 4 in a clearance fit similar to insert 12. It is provided at its surface inward of said seal with a smoothly machined surface 16—a. Both insert 12 and insert 16 function, and are hereinafter sometimes referred to, as a "non-rotating sealing member."

A packing which may be of rubber, fibrous material or any other conventional packing material, may be located inward of member 14 to fill whatever space may exist at 17 between members 14 and 16 and the inward limit of stuffing box 2. While the use of packing at point 17 is desirable to prevent accumulation of solids in said space, it forms no essential part of this invention and may be omitted.

Pump housing 1 may be provided with threaded bores 20 for the reception of bolts 19 which act to hold closure member or clamp ring 13 tightly against gasket 18 and said gasket tightly against the flange 15 of member 14. Obviously, however, any conventional fixing or adjusting devices which will firmly hold member 13 may be used. Gasket 18 is made of rubber, fibrous material or any other conventional packing. When bolts 19 are tightened against gasket 18, the said flange 15 is held tightly against gasket 36 which in turn is held against the pump housing 1 in a manner to prevent movement with respect thereto or leakage therebetween. By having member 16 press fitted or otherwise firmly secured in non-rotating and fluid tight relationship with case 14, it is seen that insert 16 is held firmly in place but depends for its ultimate support upon bolts 19.

Surrounding sleeve 4 and approximately halfway between inserts 12 and 16, is annular ring, or collar, 21, which is held against rotation with respect to sleeve 4 by set screw 22. Carried by collar 21 are a plurality of rods or pins, 23. For example, on a construction for a one-inch shaft, these pins 23 may conveniently be six in number and are preferably spaced equally around the collar 21. Said pins 23 are located with their axes parallel to the axis of sleeve 4 and, in the particular form shown, are supported by being tightly press fitted into respectively accommodating openings in ring 21. Obviously, however, any means of firmly holding pins 23 on to ring 21 will be satisfactory. Small coil springs 24 and 24—a surround pins 23 on either side of ring 21 and each bears at one end against the adjacent side of ring 21 and at the other end against the nearest surface of annular members 25 and 26, respectively, which members may, for convenience, be termed "compression members."

Said compression members 25 and 26 are fastened in any convenient manner, preferably by having said rod 23 and its mates thrust through loosely accommodating openings in shoulder 25—a and 26—a of said members 25 and 26 respectively. Here again the fit is loose to permit flexibility. Inasmuch as rod 23 is desirably kept close to sleeve 4, it will be found convenient to place in the sleeve parts 25—b and 26—b of members 25 and 26, respectively, accommodating semi-cylindrical openings 25—c and 26—c, respectively.

It should be noted, however, that the semi-cylindrical portion 25—c is not cut through all of the way to the end of portion 25—b of member 25. The same is true in member 26. Thus an uninterrupted wall is maintained across the ends of the open portions 25—c and 26—c providing smooth and uniform application of pressure onto the respectively adjacent packing rings 28 and 30.

It will also be noted that if either of said packing rings swells, instead of the radial drive pins in the adjacent compression ring being forced out of the slots in the sealing rings in many conventional types of mechanical seals, in the within disclosed device the compression ring merely is forced back along the driving pins and against the springs by which the said driving pins are not allowed to escape from their operative positions and, also, a greater pressure is secured from the springs by which to hold the said compression ring tightly against the said packing ring.

Associated with said members 25 and 26 but on sides thereof respectively remote from collar 21 are rotating sealing members 27 and 29. These members have smoothly machined faces 27—a and 29—a, which contact and rotate against the corresponding smoothly machined faces 16—a and 12—a, respectively, of non-rotating sealing members 16 and 12. The said sealing members 27 and 29 surround sleeve 4 in a "floating" or "clearance" fit but do not contact the same. By this, ample flexibility is secured inasmuch as the said members 27 and 29 are supported by packing rings 28 and 30 as hereinafter explained.

Said sealing members are counterbored on the sides thereof opposite from the above mentioned smoothly machined faces, and said counterbores contain inwardly rings 28 and 30, which are preferably rubber, fibrous or other conventional packing, and outwardly the extended sleeve-like portions 25—b and 26—b of compression rings 25 and 26. Suitable openings, as 27—b and 29—b are provided in the portions of rotating sealing members 27 and 29, which overlap the sleeve portions of compression members 25 and 26 for the reception and accommodation of the rods 23, and are of sufficient depth to permit said members 27 and 29 to move inwardly and outwardly with respect to rods 23 without losing the driving contact of said rods 23. It should also be noted that the point of contact of member 29 and member 27 at the respective slots 27—b and 29—b is at or above the mid-point of rods 23. By this, the reaction of members 27 and 29 onto the respectively contacting ends of rods 23 is such as to force said contacting portions of rods 23 centerwise of shaft 3 and thus keep said rods securely seated within their respectively receiving grooves 25—c and 26—c.

The counterbored portions of the rotating sealing members, as 29, may be finished by a slanting face, as at 29—d, as shown in Figure 6, by which when the rubber packing rings 30 is pressed by member 26 in a direction away from said ring 21, it will tend to follow the slant of such face, and, accordingly, seat itself snugly against the surface of sleeve 4. Obviously, the same may be done with ring 27. Said rotating sealing members 27 and 29 may also be provided, adjacent said smoothly machined surfaces 27—a and 29—a, with cut out portions 27—e and 29—e by which the total area of the surface 27—e and the surface 29—a are respectively reduced. This provides for quicker sealing of the rotating sealing member against the non-rotating sealing member and also makes possible greater capacity for compensation for misalignment of shaft and housing than would be possible if the wider face were used.

In member 13 there are inserted radial bores 31 and 32, which bores are fitted outwardly for pipe connections and connect inwardly by bores 33 and 34 with the annular chamber 35. Member 13 also is provided with extended portions or ears 40 which accommodate the slots 38. In these slots there are received the bolts 19 by which the member 13 is held to the pump housing 1 as shown. By the use of these slots, the bolts 19 may be adjustably spaced apart in order to meet the spacing of the holes 20 as they may variously be put by the standard practice of the manufacturing companies of the various pumps or other equipment upon which these sealing devices are to be used.

The operation of the above described device proceeds in a manner similar to that of presently known mechanical seals. The device is assembled as shown and described, and in order to effect an assembly in the absence of the pump housing 1 by the seal manufacturing company, as above indicated to be highly desirable, an annular ring indicated by the broken line 1—a may be substituted for said pump housing. Said ring, however, forms no part of the operative invention as such, but is merely a convenient device which may be used by the manufacturing company for the purpose of testing and assembling the seal apart from the pump. The initial assembly of the device proceeds as follows: Starting with member 13, the gasket 18 is inserted as shown into the recess in said member 13 and the insert 12 is pressed into place; then sleeve 4 is inserted through insert 12; then the rotating sealing member 29 is slipped onto sleeve 4 at a point adjacent to face 12—a of insert 12, and, in order thereafter, there are placed into position on or about sleeve 4, the packing ring 30, compression ring 26, the assembly comprising collar 21, rods 23, and springs 24 and 24—a and their respective counterparts, then compression ring 25, packing ring 28 and rotating sealing member 27; insert 16 is then pressed into place in case 14 and said case 14 is then slipped over the entire assembly last mentioned until the faces 27—a and 16a contact each other. Gasket 36 may at this time be slipped over sleeve 14 for positioning as shown in the drawings. Rings 8 and 9 are now put into place in the recess 7 as shown, and the member 10 is screwed into place onto enlarged portion 5 of sleeve 4. When said member 10 is tightened into place, it will be seen that the follower ring 9 will be pushed to the right as the same appears in Figure 1 and thus force ring 8 tightly into place so that it will expand laterally of the axis of shaft 3 and thus effect a tight packing fit between part 5 of sleeve 4 and the surface of shaft 3. Sleeve 4 now carries the entire assembly as shown, and is slid onto shaft 3 and the entire assembly pushed into stuffing box 2 of housing 1 (or of test ring 1—a.) The bolts 19 are positioned and tightened and the whole assembly is by them drawn into place. The entire relative arrangement of all parts should be such that at this time, by the tightening of bolts 19, the member 13 is drawn against gasket 18 to force flange 15 against gasket 36 and the entire assembly pulled together so that inserts 16 and 12 come towards each other and thus cause a compression of springs 24 and 24—a and thus cause packing rings 28 and 30 to be compressed tightly into place and, further, to expand transversely of the axis of shaft 3 and thus to seat themselves tightly into place.

The sealing mechanism is now in proper position with respect to the shaft and to the stuffing box so that member 10 is now tightened as above indicated after which the set screw 11 in member 10 is tightened into place by which to cause the sleeve 4 and parts associated therewith, to rotate in positive association with the rotation of shaft 3.

In this position the seal is fully assembled and the rotating sealing members 27 and 29 are being held by the pressure of springs 24 and 24—a tightly against the respectively adjacent faces of inserts 12 and 16.

Oil or other pressure fluid is then introduced from any convenient source into bore 32 and by it and bore 34 is discharged under pressure into annular chamber 35, from whence it moves freely through the cut-out portion 15a into the interior of case 14 and surrounds all members lying in the space radially between sleeve 4 and case 14 and longitudinally between non-rotating sealing members 12 and 16. Inasmuch as the springs 24 and 24—a hold the rotating sealing member 27 and 29 tightly against the non-rotating sealing members 16 and 12 respectively, the oil will be unable to pass between the contacting surfaces of said rotating and said non-rotating sealing members. Thus, all of the pressure of said oil is exerted against said rotating sealing members, either directly or by its pressure on the projected areas of members 25 and 26 to force said rotating sealing members 27 and 29 tightly against non-rotating sealing members 16 and 12. The pressure of said pressure fluid is maintained so that it is equal or, for safety, a few pounds greater than the pressure which is to be generated within the pump, as it may be effective at the stuffing box at point 17. The pressure of springs 24 and 24—a, however, is imposed onto the rotating sealing members in a manner additive of the pressure of said oil, so that the total pressure acting to force the rotating sealing members against the non-rotating sealing members is substantially greater than the pressure within the pump. The oil exists through bores 33 and 31.

To prevent positively any escape of liquid within the pump, the said oil pressure is maintained definitely higher than the pressure within the pump as effective at the stuffing box by which no liquid at all can leak between the seals. This is an important safety factor when, for example, a refinery is pumping propane.

In operation then, the liquid inside of the pump, working to escape from said pump along shaft 3, will be positively stopped at all prospective points of escape. Liquid working between shaft 3 and sleeve 4 will be stopped by packing ring 8. Liquid working between non-rotating sealing member, or insert, 16 and sleeve 4 will be stopped either by the packing ring 28, which does not move with respect either to sleeve 4 or rotating sealing member 27, or it will be stopped by the tight, though moving, contacts between sealing faces 27—a and 16—a. Liquid which might escape between case 14 and the pump housing 1 will be stopped by gasket 36.

It will be seen, however, that for the purpose of testing the sealing mechanism before it is installed into the pump, it is possible to assemble the device by use of a ring, already mentioned, such as indicated by broken lines 1—a, in place of the pump housing 1, and to rely upon the oil introduced through bore 32 and which may be held under a high pressure, to test the tightness of the seal at all points excepting only at gaskets 8 and 36 which points are not likely points of leakage anyway. It further permits a proper "running-in" of the seals before the same leaves the factory. They may then be shipped, completely assembled, ready for immediate installation into a pump.

In the forms shown in Figures 3 and 4, we have a modified form of the seal herein disclosed which contemplates only a single sealing surface and will be available for general use excepting only conditions under which high pressures and/or dangerous liquids are encountered, in which conditions the double seal as shown in Figures 1 and 2 will be found to be necessary. Inasmuch as the single seal assembly shown in Figures 3 and 4 is in most of its essential parts identical with corresponding parts of the outer portion of the double seal shown in Figures 1 and 2 and the parts thereof are numbered identically with corresponding parts of the double seal arrangement shown in Figures 1 and 2, its construction and operation will be obvious upon a mere inspection of the drawings thereof without a detailed description of said parts.

However, it might be well to indicate such construction and operation briefly with particular attention to those points wherein it is different from the preceding form described in detail.

Generally speaking, the single seal construction is the same as the double seal construction, but omitting from the double seal construction the case 14, associated gasket 36, insert 16, rotating sealing member 27, packing ring 28, compression ring 25, the portion of rods 23 and springs 24—a which are associated with said compression ring 25. The gland, however, is slightly different. In the first place, it does not need to be provided with a recess for the accommodation of flange 15 and, hence, may advantageously be made flat on its inward side as shown in Figure 3, save only any convenient means for the accommodation of a gasket 42. It omits, however, the oil holes appearing in gland 13 and has only accommodation for a grease cup which fits into threaded opening 43 and has a small tube 44 which goes down through the gland 41 and into the insert 12 therein. Bore 45 is then provided in insert 12 communicating with said bore 44, by which grease forced into opening 43 is conveyed through bores 44 and 45 to the face 12—a for the lubrication of said face in its contacting of rotating sealing member 29. By providing another passageway similar to that provided by bores 43, 44 and 45 and connecting the parts thereof in face 12—a of insert 12 with the part of bore 45 in face 12—a by a channel or groove in said face 12—a, means may be provided for circulating lubricating oil between the sealing faces 12—a and 29—a in place of grease. Said rotating sealing member 29, packing ring 30, compression member 26, cooperating rods 23 and springs 24 and collar 21 are, in this form, all of the same construction and operate in the same manner as in the double seal construction, save only that rods 23 extend from collar 21 in the one direction only as shown. Hence, it will be observed that Figure 5, showing the cross section of a portion of this assembly, serves equally well to illustrate the construction of both this form and the form described above.

The means by which sleeve 4 is caused to rotate positively with shaft 3 is identical with the means used in the form above described, being packing ring 8, follower ring 9, ring member 10 and set screw 11.

From the detailed description given above for the assembly and operation of the double seal construction, the corresponding assembly and operation of the single seal construction of Figures 3 and 4 is thought to be entirely obvious and, hence, need not be further explained.

It will be apparent that with either of these assemblies a pump or other equipment manufacturing company needs only to use an existing stuffing box of a diameter sufficient to receive the mechanisms described. Thus, its seal assembly problem is reduced to a minimum if not removed entirely.

It is further apparent that if the seal requires repair or adjustment, in the herein disclosed device it is a simple matter to withdraw the same bodily from the pump housing to make such necessary repair or adjustment, whereas in the presently used seals of this type it is necessary to dismantle the entire pump, in most cases, in order to reach the interior of the stuffing box for adjustment or repair of the sealing mechanism.

Accordingly, I have disclosed and described and illustrated by appropriate drawings, a mechanism of the type of mechanical seal which will effect the above named desirable objectives, particularly permitting the seal manufacturing company to test completely the equipment before it leaves its factory, relieving the pump manufacturing company, or user, from the inconvenience and heavy cost of special machining required to fit the presently used seals directly into the pump housing, and relieving the ultimate user of said pump and seal assembly from the inconvenience and heavy cost of improperly installed seals and of being required to dismantle the entire pump when it is found necessary to repair or adjust the seals therein. The mechanism as disclosed will also effect other desirable objectives as indicated above.

While I have selected a particular embodiment for the purposes of illustration herein, it is to be clearly understood that this particular embodiment is selected for illustrative purposes only and does not represent the only means by which my invention may be put into practice. Although seals of this general type have been known before this time, this arrangement by which the above named desirable objectives are secured is believed by me to be a broad advance in the art, and, hence, the claims appended hereto will be, unless specifically limited otherwise, entitled to a broad construction commensurate with such advance. Various changes may be made from the form herein disclosed without varying or departing from the terms of my invention. Such variations will be apparent to those skilled in the art upon the inspection of the accompanying drawings and the herein given disclosure, but such variations will all be within the scope of this invention as defined by the appended claims excepting wherein said claims are specifically limited otherwise.

Having thus fully described and disclosed my invention in a manner which will enable one skilled in the art to understand and to practice such invention, I claim as follows:

1. In a rotary seal associated with a shaft: a cup-shaped member telescopically related to said shaft; packing within said cup and engaging said shaft; an annular member engaging said packing and having a portion thereof located telescopically within the rim of said cup; radially aligned openings in the telescopically related portions of said annular member and the rim portion of said cup; a pin parallel to the axis of said shaft; means for supporting and driving said pin from said shaft; said pin being positioned to lie partially within each of the above mentioned radially aligned openings.

2. In a rotating mechanical seal; means for supporting a plurality of driving pins around a shaft with the axes of said pins parallel to the axis of said shaft; a driven member containing a plurality of openings having substantially radial walls respectively accommodating said driving pins, wherein the most centerwise portions of said walls are arranged to contact said pins radially outward of the midpoint of said pins, whereby the reaction of said walls in said driven member will urge said driving pins centerwise of said shaft.

3. A mechanical seal of the rotary type for use in connection with the stuffing box of a housing and a shaft associated therewith comprising in combination: a non-rotating sealing member affixed against rotation to said housing and surrounding said shaft; an annular member surrounding said shaft and affixed thereto for positive rotation therewith; a plurality of openings through said annular member parallel to the axis of said shaft and a plurality of pins inserted through said openings; a rotating sealing member adjacent said non-rotating sealing member and surrounding said shaft; a series of openings in said rotating sealing member for the reception of said pins, the radially inward side of said rotating sealing member at said openings contacting said pins at points radially outwardly of the midpoint of said pins, said pins constituting the sole means by which said rotating sealing member is driven in positive association with said annular member, and means for urging said rotating sealing member into close contact with said non-rotating sealing member.

4. In a rotating mechanical seal a compression member having a part of greater diameter and a part of lesser diameter; a plurality of openings through said part of greater diameter which said openings are parallel with the axis of said compression member and the respective axes of said openings lie substantially in the peripheral surface extended of said lesser-diameter-portion; said openings being continued into the said portion of lesser diameter as a peripheral trough therein, but which peripheral trough extends only part way across the said periphery of said portion of said lesser diameter whereby driving pins may be slidably accommodated within said openings and said troughs, but a smooth surface is presented for contact with the packing which is to be compressed.

5. In a mechanical seal, means for compressing packing within a rotating sealing member and means for driving said rotating sealing member comprising in combination: a compression ring having a greater diameter and a lesser diameter and having a series of openings through said portion of greater diameter and the axes of said openings lying substantially in the periphery extended of the said portion of lesser diameter, said openings being extended into said portion of lesser diameter to provide a plurality of cylindrical troughs therein a plurality of pins arranged within said openings and lying in said troughs so that approximately one-half of each of said pins lies radially outward of the periphery of the said portion of said compression member which is of lesser diameter; and a sealing member having a recess therein of size to accommodate the said portion of lesser diameter of said compression member and having a series of openings within the portion thereof adjacent said recess for the accommodation of said pins, whereby the portions of said rotating sealing member which contact said pins will contact said pins radially outward of the midpoint of said pins with respect to the center of said sealing member, by which the reaction of said sealing member against said pins when the same is being driven thereby will be such as to urge said pins centerwise into the said troughs of said compression member.

6. For a housing having a rotatable shaft therein, a self contained mechanical seal for insertion into a stuffing box in said housing comprising: a removable sleeve positioned partially within said stuffing box in rotating and liquid tight association with said shaft and releaseable means holding same in position; a case positioned substantially within said stuffing box concentric with said shaft and enclosing part of said sleeve; spaced apart means mounted on said sleeve cooperating respectively with other spaced apart means mounted at least partially on said case defining a chamber within said case and preventing the passage of liquid out from said chamber; a flange on said case lying against said housing on the outside thereof and a clamping ring engaging said flange in liquid tight relationship and holding same against said housing in liquid tight relationship therewith; removable means for holding said clamping ring in position fixed with respect to said housing; whereby, by disengaging the means last named and disenagaging the means holding the sleeve to the shaft, the entire sealing mechanism may be withdrawn as a unit from said stuffing box.

7. A self-contained mechanical rotary seal for a housing having a wall and a rotatable shaft extending through said wall comprising in combination: a sleeve surrounding and rotating with said shaft; a case surrounding said sleeve and affixed non-rotatably with respect to said housing, a portion of said case being outwardly of said housing and means cooperating with said portion and supporting said case thereby solely from an outer face of said housing wall; a pair of sealing means, each having a smooth radially positioned sealing surface, surrounding and rotating with said sleeve and being in liquid tight association therewith and spaced apart axially therealong; means spaced apart axially of said shaft and each having a smooth, radial sealing face cooperating respectively with a sealing face of one of said foregoing rotatable sealing means, whereby to cause spaced apart portions of said case to be in liquid tight but relatively rotatable relationship with said sleeve; means preventing the passage of liquid between said sleeve and said shaft; means preventing passage of liquid between said case and said housing; means through which a fluid under pressure is introduced to the interior of said case and between said above mentioned spaced apart pairs of cooperating sealing means.

8. A self-contained mechanical rotary seal for a housing having a rotatable shaft therein comprising in combination: a sleeve surrounding said shaft and means to prevent relative rotation between said sleeve and said shaft and means to prevent the passage of fluid between said sleeve and said shaft; a pair of sealing members carried by and spaced apart axially of said sleeve; a ring member surrounding said shaft axially outwardly of the housing; a sealing member held by said ring member in non-rotatable and liquid tight relationship with said housing and in operative association with the outermost of said pair of sealing members; a cylindrical case having one end in close proximity to said ring member and held against the outside of said housing solely thereby and having on the other end a sealing member held in liquid tight and non-rotatable relationship therewith and also held in operative relationship to the innermost of said pair of first named sealing members; and means through said ring member through which a fluid under pressure may be circulated through the interior of said case.

9. A mechanical seal of the cartridge type for insertion into the stuffing box of a housing and onto a rotatable shaft therein comprising in combination: a cylindrical sleeve arranged around said shaft; means causing said sleeve to rotate in positive association with said shaft; and means preventing passage of fluid between said sleeve and said shaft; a case radially spaced from said sleeve and fitting within the stuffing box of said housing; a non-rotatable sealing member closely surrounding said sleeve affixed to said case internally thereof and held against rotation thereby; a closure member surrounding said sleeve at a point spaced axially of said shaft from the above named non-rotating sealing member; means operatively associated with said closure means by which a force urging said closure member inwardly of said pump housing will act upon said case to hold the same in a position fixed with respect to said pump housing; means urging said closure member toward said pump housing; a rotating sealing member located upon said sleeve and within said case; means located upon said sleeve causing positive rotation of said rotating sealing member with said sleeve and means operatively associated with said last named means urging said rotating sealing member against said non-rotating sealing member, effecting an intimate contact therebetween to prevent the passage of liquid between said rotating and said non-rotating sealing members.

10. A mechanical seal of the cartridge type for application into the stuffing box of a housing and a rotatable shaft therein comprising in combination: a sleeve surrounding said shaft and having associated therewith means causing said sleeve to rotate with said shaft and further means preventing the passage of fluid between said sleeve and said shaft; a non-rotating sealing member surrounding said shaft; a closure member surrounding said non-rotating sealing member and holding same against rotation with respect thereto; a non-rotating sealing member surrounding said sleeve at a point thereon spaced axially from the abovementioned non-rotating sealing member; a cylindrical case radially spaced from said sleeve and holding at the end thereof inward of said housing the last above named non-rotating sealing member and retaining same against rotation with respect thereto; means located outside of said housing associated with the other end of said case holding same in liquid tight relationship with said housing; means associated with said closure member holding it fixed with respect to said housing and further holding said closure member in liquid tight association with a portion of said case; a pair of rotating sealing members surrounding said sleeve and accommodated in the space between said sleeve and said case and each arranged in intimate contact with one of said non-rotating sealing members but permitting rotation of said rotating sealing members; means mounted on said sleeve effecting positive rotation of said rotating sealing members and urging same against said non-rotating sealing members; means preventing the passage of fluid between said rotating sealing members and said sleeve; means permitting the introduction of a fluid under pressure into the space between said sleeve and said case by which said fluid will urge said rotating sealing members against said non-rotating sealing members.

CHRISTOPHER E. WIESSNER.